No. 647,098. Patented Apr. 10, 1900.
A. KITSON.
CELLULAR ELASTIC TIRE.
(Application filed Nov. 27, 1899.)
(No Model.)
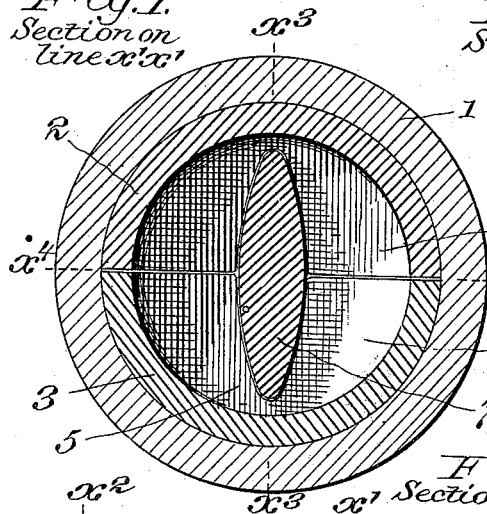
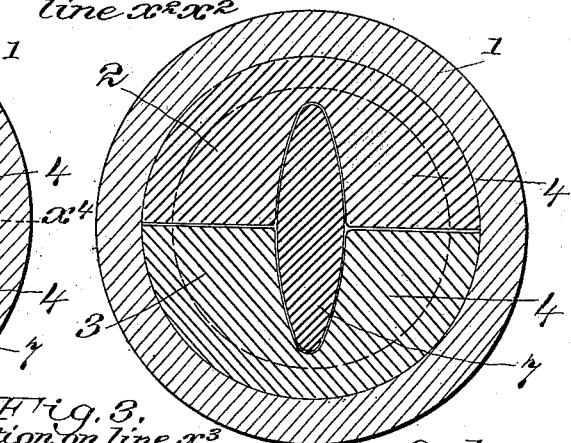
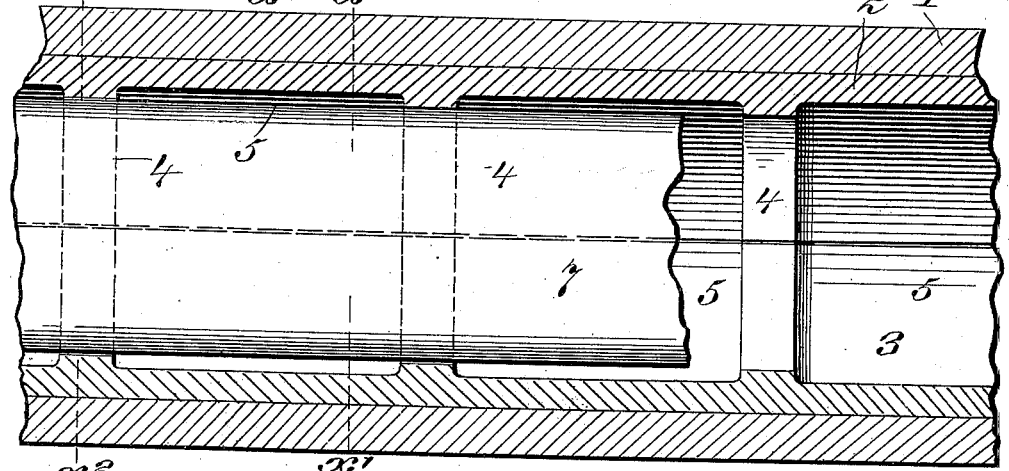
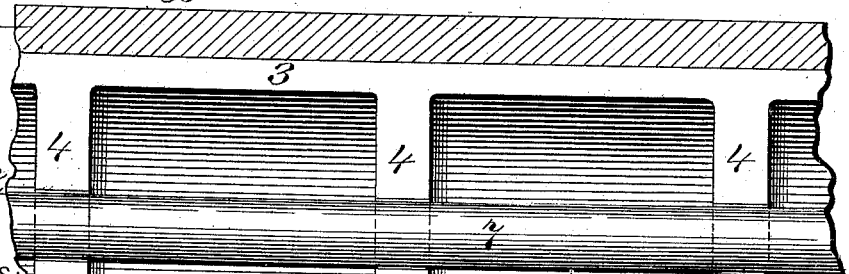
WITNESSES:
Thos. T. Smith.
W. H. Pumphrey.
INVENTOR
Arthur Kitson
BY
A. Parker Smith
ATTORNEY

UNITED STATES PATENT OFFICE.

ARTHUR KITSON, OF PHILADELPHIA, PENNSYLVANIA.

CELLULAR ELASTIC TIRE.

SPECIFICATION forming part of Letters Patent No. 647,098, dated April 10, 1900.

Application filed November 27, 1899. Serial No. 738,320. (No model.)

*To all whom it may concern:*

Be it known that I, ARTHUR KITSON, a subject of the Queen of Great Britain, and a resident of Philadelphia, (Germantown,) county of Philadelphia, State of Pennsylvania, have invented certain new and useful Improvements in Cellular Elastic Tires, of which the following is a specification.

My invention relates in general to elastic tires for vehicles, and is more specifically designed to produce an improved elastic tire for use on automobile vehicles.

As is well known, it is necessary in some types of automobile vehicles, especially those carrying storage batteries, to have a highly-elastic tire in order to protect the vehicle from shocks and vibrations. At the same time the weight of the vehicle and the severe usage to which the tires are consequently put, especially in winter when running over sharp cutting edges of ice, rapidly destroy the ordinary pneumatic tire.

My invention has to a high degree the elasticity necessary for the above-mentioned uses; but not being a pneumatic tire it is not destroyed by punctures or such ordinary cuts as a tire receives during usage.

The invention consists of a cellular tire of built-up sections which is light in weight, cheap to construct, highly elastic, and composed of parts which are readily replaced when worn-out.

The preferred form of my invention is illustrated in the accompanying sheet of drawings, in which—

Figure 1 is a cross-section of the tire on line $x'\ x'$ of Fig. 3. Fig. 2 is a similar cross-section on line $x^2\ x^2$ of Fig. 3. Fig. 3 is a longitudinal central section on line $x^3\ x^3$ of Fig. 1, and Fig. 4 is a similar section on line $x^4\ x^4$ of Fig. 1.

Throughout the drawings like reference-figures refer to like parts.

The tire is composed of a cylindrical envelop 1, which has a cellular filling of elastic material, such as india-rubber, formed in two sections, numbered 2 and 3. Each of these semicylindrical sections has a series of transverse walls 4 4, &c., leaving between them cellular spaces 5 5, &c. Each of these transverse walls has a recess lying approximately in a plane at right angles to the plane of separation between the sections. The recesses in the two sections 2 and 3 register one with another when the sections are assembled to form a cylinder, as shown in Figs. 2 and 3. In the space so formed I introduce a core 7 of such cross-section as to completely fill the recesses 6, also formed of elastic material.

The mode of operation of my invention is as follows: The parts being assembled, as shown in the drawings, a cellular sectional tire is formed which has great elasticity to compression in a line at right angles to the plane of separation of the sections. This plane of separation I arrange at right angles to the plane of rotation of the wheel, so that the tire presents its greatest elasticity in the direction of compression when in use. The tire is built up by assembling the sections 2, 3, and 7 and drawing them into the envelop 1. It is evident that the outer wall of the tire will be continuously supported by the core, as shown in Fig. 3. Preferably I make the core 7 of an elliptical cross-section, as this affords the greatest resistance to compression for a given amount of material when the core is so arranged that its major axis coincides to the line of pressure. The core is kept from buckling under compression by the transverse walls 4, and said transverse walls also serve their purpose in acting as an arch to prevent the distention of the tire sidewise and its consequent collapse in the line of pressure.

It is evident, of course, that various changes could be made in details of construction illustrated without departing from the spirit and scope of my invention, so long as the principle of operation and the general arrangement of parts above described are preserved. The transverse walls might be placed nearer together and the cross-section of the core 7 enlarged in the direction of either axis. The relative thicknesses of the various parts might be varied, but all such modifications I should still consider within the boundaries of my invention.

Having therefore described my invention, what I claim as new, and desire to protect by Letters Patent, is—

1. In a tire the combination of the cylindrical envelop, the cellular filling therefor formed in two sections, and the core embedded in recesses in the transverse walls of the cellular sections.

2. In a tire the combination of the cylindrical envelop, the cellular filling therefor formed in two sections, divided on a plane at right angles to the plane of rotation, and the core embedded in recesses in the transverse walls of the cellular sections.

3. In a tire the combination of the cylindrical envelop, and the cellular filling therefor formed in two sections, the transverse walls of said cellular sections being divided by recesses lying in a plane at right angles to the plane of separation between the sections.

4. In a tire the combination of the cylindrical envelop, the cellular filling therefor formed in two sections and the core embedded in recesses in the transverse walls of the cellular sections, said core having a cross-section in the form of an ellipse, the major axis of which is at right angles to the plane of separation between the sections.

Signed by me at New York, N. Y., this 23d day of November, 1899.

ARTHUR KITSON.

Witnesses:
W. H. PUMPHREY,
THOMAS TITUS SMITH.